United States Patent [19]

Clark et al.

[11] 4,105,617
[45] Aug. 8, 1978

[54] ORGANIC SOLVENT DISPERSIONS OF SILICONE ELASTOMERS

[75] Inventors: William H. Clark; Charles E. Skinner, both of Midland, Mich.

[73] Assignee: Dow Corning Corporation, Midland, Mich.

[21] Appl. No.: 760,786

[22] Filed: Jan. 19, 1977

Related U.S. Application Data

[63] Continuation-in-part of Ser. No. 578,707, May 19, 1975, abandoned.

[51] Int. Cl.² .................................................. C08K 5/09
[52] U.S. Cl. ........................ 260/31.2 N; 260/32.8 SB; 260/33.2 SB; 260/33.4 SB; 260/33.6 SB; 260/33.8 SB; 260/37 SB; 528/32; 528/34; 528/901; 528/38
[58] Field of Search ............... 260/31.2 R, 31.2 N, 260/31.8 S, 33.2 SB, 33.4 SB, 33.6 SB, 33.8 SB, 46.5 G, 46.5 E, 824

[56] References Cited

U.S. PATENT DOCUMENTS

| | | | |
|---|---|---|---|
| 2,927,907 | 3/1960 | Polmanteer | 260/46.5 |
| 3,127,363 | 3/1964 | Nitzche et al. | 260/46.5 G |
| 3,189,576 | 6/1965 | Sweet | 260/46.5 |
| 3,305,502 | 2/1967 | Lampe | 260/33.4 SB |
| 3,308,080 | 3/1967 | Haenni | 260/33.2 SB |

*Primary Examiner*—J. Ziegler
*Attorney, Agent, or Firm*—Roger H. Borrousch

[57] ABSTRACT

A mixture of a hydroxyl endblocked polydimethylsiloxane, ethylpolysilicate, a silane of the formula

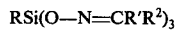

$$RSi(O-N=CR'R^2)_3$$

where R is methyl or vinyl and each R' and R² is methyl or ethyl, organotin carboxylate, an extending filler and organic solvent provides dispersions which cure to silicone elastomers at room temperature. These compositions have long storage life sufficient to permit storage in a single container for extended periods of time. These compositions can be prepared extrudable or sprayable, are pigmentable, have high strength, and are readily prepared.

10 Claims, No Drawings

ORGANIC SOLVENT DISPERSIONS OF SILICONE ELASTOMERS

This is a continuation-in-part of application Ser. No. 578,707, filed May 19, 1975, abandoned.

BACKGROUND OF THE INVENTION

1. Field of the Invention

This invention relates to room temperature vulcanizable silicone elastomeric compositions in organic solvents.

2. Description of the Prior Art

Silicone elastomers which cure at room temperature have been known for some time. Such elastomers have been prepared by using crosslinking systems which cure upon mixing the ingredients, such compositions are stored in two or more containers; and by using crosslinking systems which are stable in the absence of moisture but which cure upon exposure to moisture, such compositions are storable in a single container.

One type of silicone elastomer which is stored in two containers and which cures upon mixing an organosiloxane, an alkylopolysilicate and a methyl carboxylate is well known as described by Polmanteer in U.S. Pat. No. 2,927,907.

A room temperature vulcanizable silicone elastomeric composition storable in a single container combines a hydroxylated organosiloxane and a silane of the formula $$R^3Si(O-N=CR^4R^5)_3$$

is well known as described by Sweet in U.S. Pat. No. 3,189,576 which is hereby incorporated by reference to show the ketoxime silanes and their preparation.

It was unexpected that silicone elastomers could be prepared by combining these two crosslinking systems to provide both improved physical properties and long storage life.

SUMMARY OF THE INVENTION

An object of this invention relates to a silicone elastomeric composition which cures at room temperature using a ketoxime silane crosslinker and an ethylpolysilicate crosslinker and which has long storage life and improved physical properties.

This invention relates to a silicone elastomeric composition obtained by mixing a hydroxyl endblocked polydimethylsiloxane, soluble ethylpolysilicate, a ketoxime silane, organotin carboxylate, extending filler and organic solvent where the composition is extrudable or sprayable and has a long storage life, such as greater than one month in the absence of moisture and cures to elastomers which have improved strength.

DESCRIPTION OF THE INVENTION

This invention relates to a silicone elastomeric composition obtained by mixing ingredients consisting essentially of (A) 100 parts by weight of a benzene soluble hydroxyl endblocked polydimethylsiloxane having a viscosity of at least 100,000 cps. at 25° C., (B) from 12 to 35 parts by weight of a soluble ethylpolysilicate, (C) from 8 to 20 parts by weight of a silane of the formula $$RSi(O-N=CR'R^2)_3$$

in which R is selected from the group consisting of methyl and vinyl, and R' and $R^2$ are each selected from the group consisting of methyl and ethyl, (D) from 0.1 to 2 parts by weight of organotin carboxylate, (E) from 10 to 150 parts by weight of an extending filler, and (F) sufficient organic solvent to provide a solvent content of from 15 to 95 weight percent solvent based on the total weight of the composition, said organic solvent being selected from the group consisting of aliphatic hydrocarbons, chlorinated aliphatic hydrocarbons, aromatic hydrocarbons, ketones, esters, ethers and mixtures thereof wherein said organic solvent is a solvent for the silicon containing species and alcohols can be present in the organic solvent in amounts which do not exceed 10 weight percent of the total solvent, the combined parts by weight of (B) and (C) being from 20 to 50 parts by weight based on 100 parts by weight of (A) and the weight ratio of (B) to (C) being from 1.0 to 3.0.

The hydroxyl endblocked polydimethylsiloxanes, (A), have viscosities of at least 100,000 centipoise (cps.) at 25° C., preferably the viscosities are such that the polydimethylsiloxanes are gums, or above about 1,000,000 cps. at 25° C. Polydimethylsiloxanes which have a viscosity below 100,000 cps. at 25° C. do not provide the improved properties of the cured elastomer. For the purposes of this invention, the polydimethylsiloxanes can contain small amounts of other diorganosiloxane units, monoorganosiloxane units and $$SiO_2$$

units. Such units can be illustrated by methylvinylsiloxane units, diphenylsiloxane units, methylphenylsiloxane units, monomethylsiloxane units and the like. Such siloxane units can be present in amounts which do not substantially change the character of the polydimethylsiloxane, such as a few mol percent. The polydimethylsiloxanes are substantially linear but can contain some branching which means that there may be some molecules with more than two hydroxyl radicals. However, for all practical purposes the polymers of (A) are hydroxyl endblocked polydimethylsiloxane.

The ethylpolysilicate, (B), and the silanes, (C), are well known materials. Silanes, (C), have a formula $$RSi(O-N=CR'R^2)_3$$

where R is methyl or vinyl and each R' and $R^2$ is a methyl or ethyl. The combination of (B) and (C) are pertinent to the success of using them in the compositions of this invention, inasmuch as the amounts of these two ingredients in the complete composition is important, as well as, their relationship to one another. The ethylpolysiloxate, (B), is present in an amount of from 12 to 35 parts by weight per 100 parts by weight of (A), preferably from 15 to 30 parts by weight. Silane (C) is present in an amount of from 8 to 20 parts by weight per 100 parts by weight of (A), preferably from 10 to 15 parts by weight.

Although (B) can be present in an amount of 12 to 35 parts by weight and (C) can be present in an amount of 8 to 20 parts by weight, the combined weight of (B) and (C) in the compositions of this invention is from 20 to 50 parts by weight per 100 parts by weight of (A), preferably from 25 to 45 parts by weight. When this range is violated in either direction, high or low side, the properties of the cured elastomer deteriorate and the storage life is reduced, such that the compositions when stored in a single container gel within a weeks time.

In addition to the combined weight of (B) and (C) being important to the properties of the resulting composition and cured elastomer, the relative amounts of (B) and (C) to each other is also important to the final composition and the cured properties. The weight ratio of (B) to (C) can be from 1.0 to 3.0 inclusive. Outside this weight ratio the storage life decreases and the properties of the cured elastomer decrease.

The organotin carboxylate, (D), can be any of the tin carboxylate catalyst, such as dibutyltindiacetate, dibutyltindi-2-ethylhexoate, dibutyltindilaurate and the like. The organotin carboxylate can be present in an amount from 0.1 to 2 parts by weight per 100 parts by weight of (A), preferably from 0.2 to 1 part by weight.

The extending filler, (E), can be any of those extending fillers known, such as titanium dioxide, calcium carbonate, quartz, asbestos, diatomaceous earth, iron oxide and the like. The amount of (E) can be from 10 to 150 parts by weight per 100 parts by weight of (A), preferably from 25 to 100 parts by weight. Small amounts of reinforcing silica or carbon black can be present, such as up to 2 parts by weight per 100 parts by weight of (A).

The organic solvent is present in amounts sufficient to provide from 15 to 95 weight percent based on the total weight of the composition. When the amounts of solvent used are from 15 to 30 weight percent, the composition is a stiff paste like composition useful as a caulk, for example. When amounts of solvent used are from 40 to 60 weight percent, the composition is a soft paste to fluid materials which can readily be extruded and many are sprayable. When amounts of solvent used are above 60 weight percent, the composition is fluid and is readily sprayable.

The organic solvents can be aliphatic hydrocarbons, such as mineral spirits, hexane, heptane, and naphthas; chlorinated aliphatic hydrocarbons, such as carbon tetrachloride, methylene chloride, 1,1,1-trichloroethane, ethylene dichloride, perchloroethylene and propylene dichloride; ketones such as acetone, methylethyl ketone, methyl isobutyl ketone, cyclohexanone and diacetone; aromatics such as benzene, toluene, xylene, and aromatic naphthas; esters such as ethylacetate, isopropylacetate, normal propylacetate, butylacetate and amylacetate; and ethers such as dioxane, dichloroethyl ether, tetrahydrofuran, dibutyl ether and mesityl oxide.

The alcohols can be used in amounts of up to 10 weight percent of the total organic solvent and should not be used as the only solvent or in amounts of greater than 10 weight percent of the organic solvent content. Alcohols, for example, include methanol, ethanol, isopropanol, normal propanol, butanol, ethylene glycol, propylene glycol, diethylene glycol, monomethyl ether of ethylene glycol and monomethyl ether of diethylene glycol. The preferred solvents are mineral spirits and if an alcohol is used it is preferably butanol and in mixtures with mineral spirits.

The unique combination of organic solvent, high viscosity polydimethylsiloxane and the defined combination of ethylpolysilicate and ketoxime silane, (C), work together in some yet unknown manner to provide a storage life sufficient to package the composition in a single container for periods of a month or more and still result in excellent physical properties when cured to an elastomer at room temperature.

Other conventional ingredients used in silicone rubber, such as heat stability additives, pigments and colorants, flame retardant additives, thickeners and the like can be used in these compositions.

The compositions of this invention can be prepared by mixing the ingredients in various ways more of which preferably add the organotin carboxylate, (D), last. However, the best method for mixing is to combine the organic solvent, except for any alcohol to be used, with the extending filler, (E), and then add and disperse the polydimethylsiloxane, (A), thereafter adding to this mixture, ethylpolysilicate (B), any alcohol, silane (C), and finally the organotin carboxylate last. Conventional mixers and mills can be used for the mixing operations, however, some precautions should be taken when handling silane (C) because these materials are particularly sensitive to reaction with moisture.

The compositions of this invention can be used as caulks, sealants, sprayable paints, roof coatings and the like.

The following examples are presented for illustrative purposes and should not be construed as limiting this invention which is properly delineated in the claims. In the following examples all parts are parts by weight except where otherwise stated and all viscosities are at 25° C. unless otherwise stated.

EXAMPLE 1

A composition was prepared by thoroughly wetting 50 parts of calcium carbonate in 200 parts of mineral spirits in a mixer and then adding 100 parts of a hydroxyl endblocked polydimethylsiloxane gum having a Williams plasticity between 0.055 and 0.059 inch. The gum contained about one weight percent fume silica. To this base dispersion, varying amounts of ethylpolysilicate (EPS) was added and then in order the silane

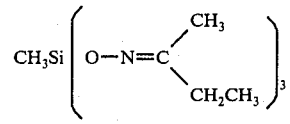

and one part of an equal weight mixture of dibutyltindi-2-ethylhexoate and xylene. The amounts of the EPS and silane added were as shown in Table I. The physical properties shown in Table I were on samples cured at room temperature for 7 days and for 1 month by ASTM methods, tensile and elongation at break by ASTM-D-412 and Die "B" tear strength by ASTM-D-624-54. The viscosities shown in Table I were obtained from the dial readings of a Brookfield HBT viscometer using a No. 5 spindle at 20 r.p.m.

Table I

| Reference No. | EPS, parts | Silane parts | Length of Cure | Durometer, Shore A | Tensile, p.s.i. | Elongation, % | Tear Strength p.p.i. | Brookfield Viscosity After | | | |
|---|---|---|---|---|---|---|---|---|---|---|---|
| | | | | | | | | 1 Day | 2 Weeks | 3 Weeks | 1 Month |
| 1 | 0 | 15 | 7 days | 42 | 385 | 865 | 52 | 23.8 | 24.6 | — | — |
| 2. | 15 | 10 | 7 days | 41 | 634 | 932 | 60 | 30.0 | 30.0 | — | 27.5 |
| | | | 1 month | 45 | 630 | 740 | 74 | | | | |
| 3. | 25 | 10 | 7 days | 45 | 600 | 800 | 72 | 24.5 | 24.5 | — | 22.5 |
| | | | 1 month | 53 | 720 | 800 | 101 | | | | |
| 4. | 15 | 15 | 7 days | 42 | 640 | 865 | 60 | 19.0 | 20.0 | — | — |

Table I-continued

| Reference No. | EPS, parts | Silane parts | Length of Cure | Durometer, Shore A | Tensile, p.s.i. | Elongation, % | Tear Strength p.p.i. | Brookfield Viscosity After 1 Day | 2 Weeks | 3 Weeks | 1 Month |
|---|---|---|---|---|---|---|---|---|---|---|---|
| 5. | 20 | 15 | 7 days | 43 | 600 | 600 | 82 | — | — | — | — |
|  |  |  | 1 month | 45 | 638 | 740 | 75 |  |  |  |  |
| 6. | 25 | 15 | 7 days | 44 | 780 | 835 | 78 | 17.3 | 18.0 | — | — |
| 7. | 30 | 15 | 7 days | 46 | 645 | 650 | 71 | — | — | — | — |
|  |  |  | 1 month | 50 | 600 | 625 | 90 |  |  |  |  |
| 8. | 25 | 20 | 7 days | 45 | 690 | 625 | 48 | 14.5 | 14.5 | — | 14.5 |
|  |  |  | 1 month | 51 | 720 | 650 | 66 |  |  |  |  |

EXAMPLE 2

A. A composition was prepared as described in Example 1, except 100 parts of titanium dioxide was used in place of the calcium carbonate, 14 parts of a silane of the formula

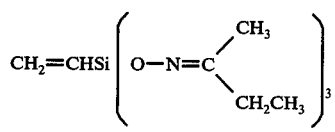

was used in place of the silane of Example 1, and 25 parts of ethylpolysilicate was used.

B. A composition as described above for A. was prepared except 100 parts of 5 micron quartz was used in place of the titanium dioxide.

The above compositions were cured at room temperature for 7 days and the physical properties obtained, were as shown in Table II.

Table II

|  | Composition A | Composition B |
|---|---|---|
| Durometer, Shore A | 35 | 40 |
| Tensile, p.s.i. | 850 | 860 |
| Elongation, % | 605 | 480 |
| Tear Strength, p.p.i. | 86 | 66 |
| Brookfield Viscosity |  |  |
| After 1 day | 15.6 | 17.8 |
| After 12 days | 15.8 | 17.7 |

EXAMPLE 3

The following compositions were prepared and the properties obtained as described in Example 1 except for the changes in ingredients as specified.

A. 253 parts of mineral spirits was used in place of 200 parts, 100 parts of 5 micron quartz was used in place of the 50 parts of calcium carbonate, 15 parts of silane of Example 1 was used, 25 parts of ethylpolysilicate was used and 7.5 parts of asbestos was added.

B. A composition as described in A. above was repeated except 12.5 parts of asbestos was used in place of the 7.5 parts.

C. A composition as described in A. above was repeated except the asbestos was left out.

D. A composition as described in A. above was repeated except that asbestos was left out, 278 parts of mineral spirits was used in place of the 253 parts and 3.5 parts of a thickening agent was added.

The above compositions were cured for 7 days at room temperature and the properties were obtained and were as shown in Table III. Composition A. was cured after 2.5 months of storage at room temperature and after a seven day cure at room temperature had a Durometer of 57 on the Shore A scale, a tensile of 675 p.s.i., an elongation of 390 and a tear strength of 66 p.p.i.

Table III

|  | Composition A. | B. | C. | D. |
|---|---|---|---|---|
| Durometer, Shore A | 62 | 66 | 48 | 57 |
| Tensile, p.s.i. | 620 | 840 | 787 | 920 |
| Elongation, % | 275 | 280 | 460 | 420 |
| Tear Strength, p.p.i. | 72 | 91 | 69 | 71 |
| Brookfield Viscosity, |  |  |  |  |
| After 1 day | — | — | — | 36.5 |
| After 2 days | — | — | 18.0 | — |
| After 3 days | 20.4 | — | — | — |
| After 4 days | — | 22.3 | — | — |
| After 8 days | 20.0 | — | — | — |
| After 11 days | — | 23.0 | — | 36.4 |
| After 3 weeks | 20.0 | — | 17.5 | 32.5 |
| After 1 month | — | 23.0 | — | — |

That which is claimed is:

1. A silicone elastomeric composition obtained by mixing ingredients consisting essentially of
   (A) 100 parts by weight of a benzene soluble hydroxyl endblocked polydimethylsiloxane having a viscosity of at least 100,000 cps. at 25° C.,
   (B) from 12 to 35 parts by weight of a soluble ethylpolysilicate,
   (C) from 8 to 20 parts by weight of a silane of the formula $$RSi(O-N=CR'R^2)_3$$

in which R is selected from the group consisting of methyl and vinyl, and R' and $R^2$ are each selected from the group consisting of methyl and ethyl,
   (D) from 0.1 to 2 parts by weight of organotin carboxylate,
   (E) from 10 to 150 parts by weight of an extending filler, and
   (F) sufficient organic solvent to provide a solvent content of from 15 to 95 weight percent solvent based on the total weight of the composition, said organic solvent being selected from the group consisting of aliphatic hydrocarbons, chlorinated aliphatic hydrocarbons, aromatic hydrocarbons, ketones, esters, ethers and mixtures thereof wherein said organic solvent being a solvent for the silicon containing species and alcohols can be present in the organic solvent in amounts which do not exceed 10 weight percent of the total solvent, the combined parts by weight of (B) and (C) being from 20 to 50 parts by weight based on 100 parts by weight of (A) and the weight ratio of (B) to (C) being from 1.0 to 3.0.

2. The silicone elastomeric composition according to claim 1 in which (B) is present in an amount of from 15 to 30 parts by weight, (C) is present in an amount of from 10 to 15 parts by weight, and the combined parts by weight of (B) and (C) are from 25 to 45.

3. The silicone elastomeric composition according to claim 1 in which (A) has a viscosity of at least 1,000,000 cps. at 25° C.

4. The silicone elastomeric composition according to claim 2 in which (A) has a viscosity of at least 1,000,000 cps. at 25° C.

5. The silicone elastomeric composition according to claim 1 in which the organic solvent is present in an amount of from 40 to 60 weight percent based on the total weight of the composition.

6. The silicone elastomeric composition according to claim 2 in which the organic solvent is present in an amount of from 40 to 60 weight percent based on the total weight of the composition.

7. The silicone elastomeric composition according to claim 1 in which R is methyl, R' is methyl and $R^2$ is ethyl.

8. The silicone elastomeric composition according to claim 6 in which R is methyl, R' is methyl and $R^2$ is ethyl.

9. The silicone elastomeric composition according to claim 1 in which R is vinyl, R' is methyl and $R^2$ is ethyl.

10. The silicone elastomeric composition according to claim 6 in which R is vinyl, R' is methyl and $R^2$ is ethyl.

* * * * *

UNITED STATES PATENT AND TRADEMARK OFFICE
CERTIFICATE OF CORRECTION

PATENT NO. : 4,105,617

DATED : August 8, 1978

INVENTOR(S) : William H. Clark and Charles E. Skinner

It is certified that error appears in the above-identified patent and that said Letters Patent are hereby corrected as shown below:

Column 1, line 23 - the word "alkylopolysilicate" shoud read "alkylpolysilicate"

Column 4, line 11 - the word "more" should read "most"

Signed and Sealed this

Eighth Day of December 1981

[SEAL]

Attest:

Attesting Officer

GERALD J. MOSSINGHOFF

Commissioner of Patents and Trademarks